Figure 1:
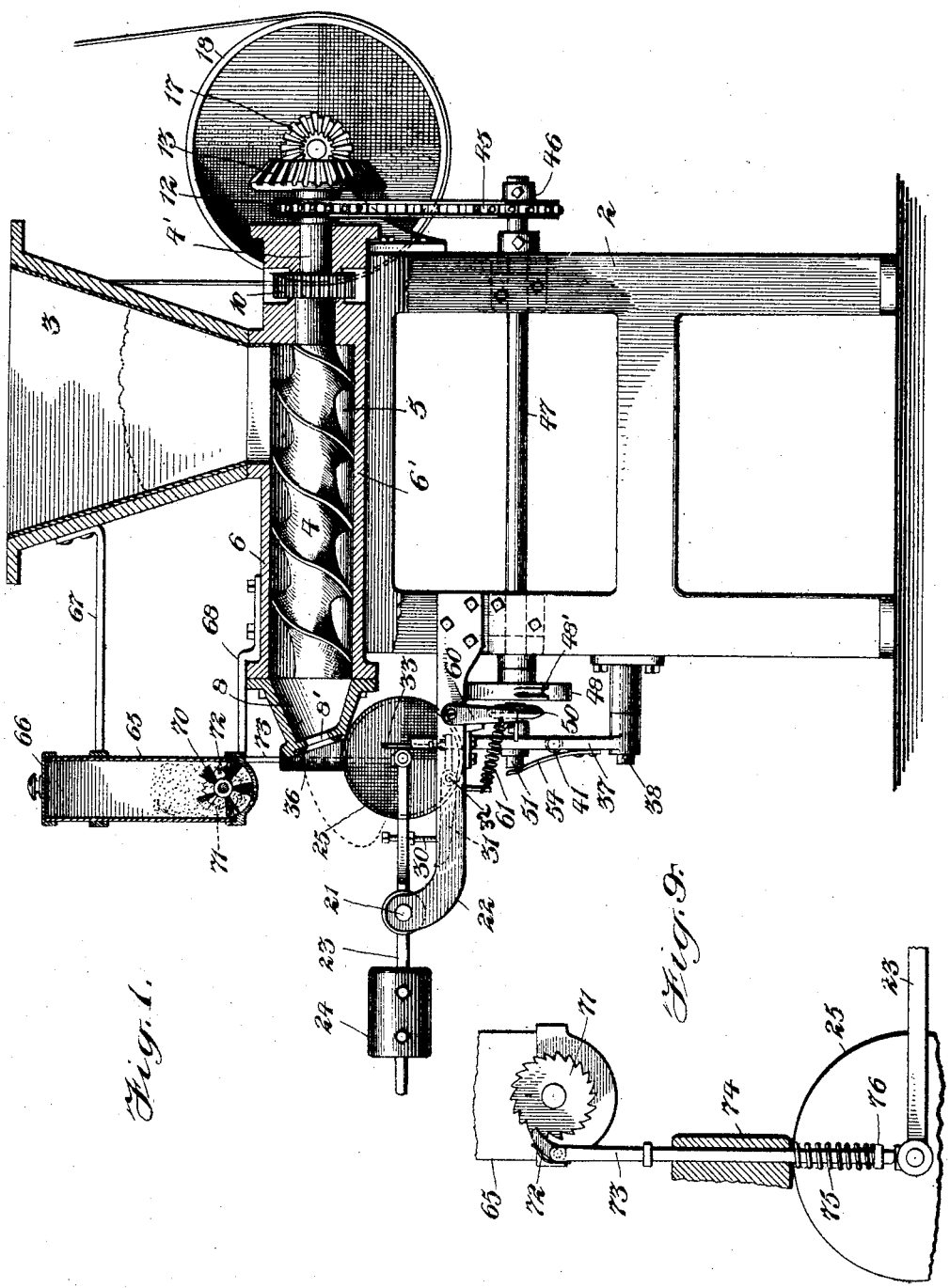

No. 782,338. PATENTED FEB. 14, 1905.
G. J. HICKS.
AUTOMATIC WEIGHING MACHINE.
APPLICATION FILED MAY 12, 1902.

4 SHEETS—SHEET 1.

Witnesses
Geo. W. Naylor
M. L. Forrest

Inventor
George J Hicks
By his Attorney
Chas. F. Dane

No. 782,338. PATENTED FEB. 14, 1905.
G. J. HICKS.
AUTOMATIC WEIGHING MACHINE.
APPLICATION FILED MAY 12, 1902.

4 SHEETS—SHEET 2.

Witnesses
Geo. W. Naylor.
M. L. Forrest.

Inventor
George J Hicks
By his Attorney
Chas. F. Dane

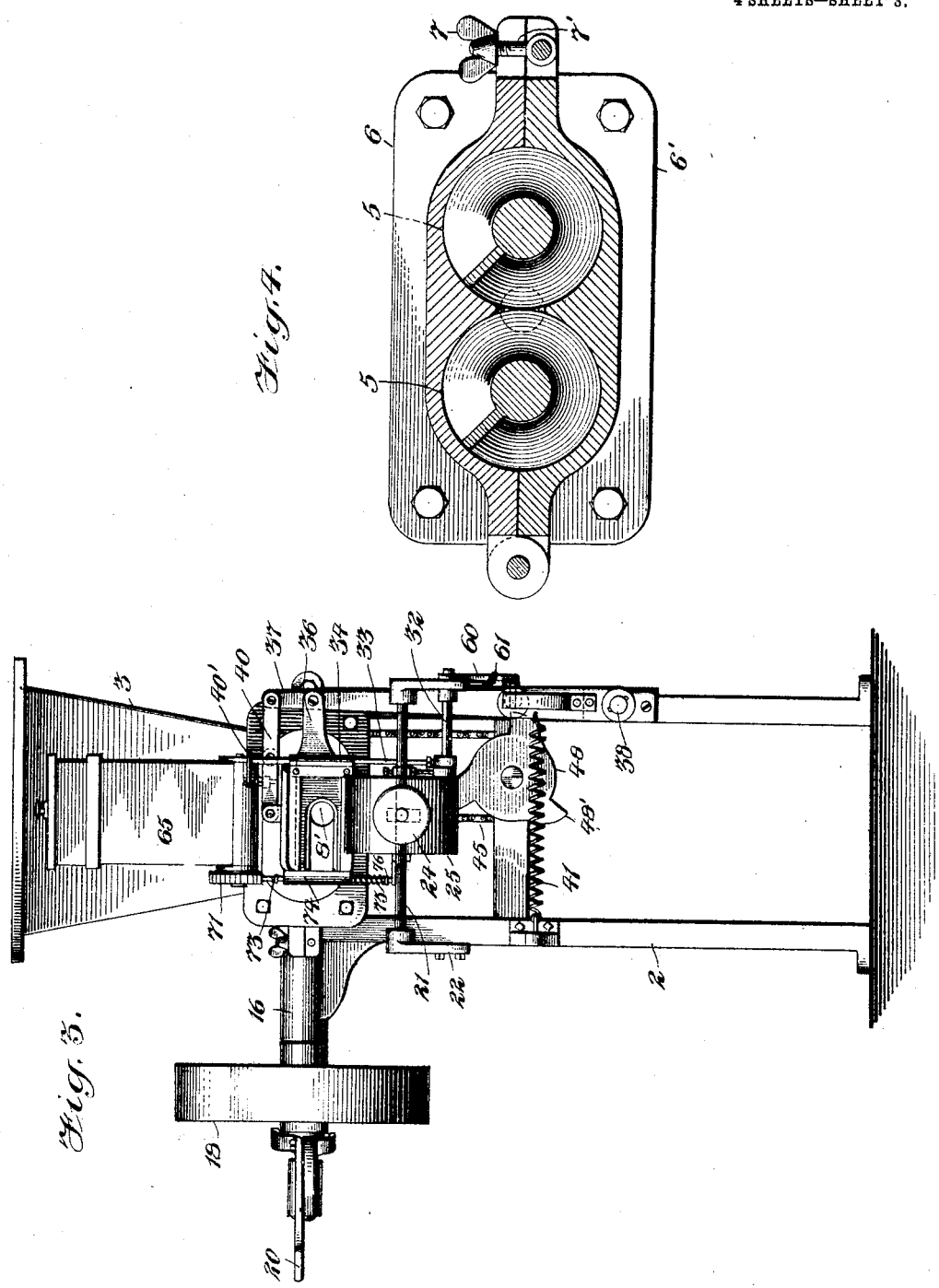

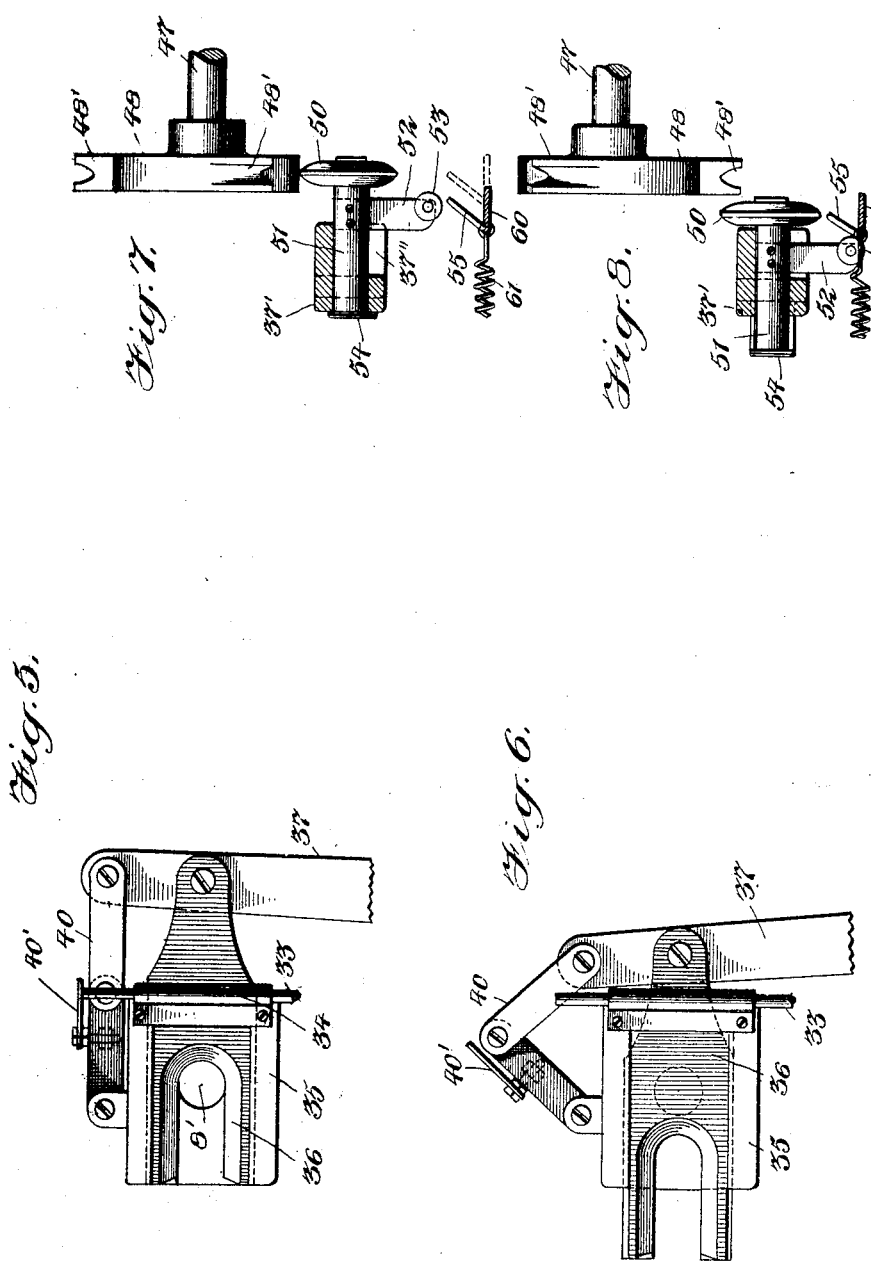

No. 782,338.

Patented February 14, 1905.

UNITED STATES PATENT OFFICE.

GEORGE J. HICKS, OF ARDSLEY, NEW YORK.

AUTOMATIC WEIGHING-MACHINE.

SPECIFICATION forming part of Letters Patent No. 782,338, dated February 14, 1905.

Application filed May 12, 1902. Serial No. 106,862.

*To all whom it may concern:*

Be it known that I, GEORGE J. HICKS, a citizen of the United States, residing at Ardsley, Westchester county, State of New York, have invented certain new and useful Improvements in Automatic Weighing-Machines, of which the following is a specification.

This invention relates to automatic weighing-machines, and especially to an automatic weighing-machine for weighing plastic substances—such, for example, as dough—into batches containing a determined uniform amount.

One of the most important features of my improved weighing-machine is the organization of suitable load-supplying or plastic-feeding means, with a load-receiver, in such a manner as to reduce the factors of impact and momentum to a minimum, and thus obtain a more accurate result than in machines in which allowance has to be made for these factors.

Another important feature of my improved machine is the provision of a load-receiver 25 freely movable during the loading operation to transfer its load from the delivery end of the supply devices to a point at a distance therefrom, the preferred construction being one in which a wheel having a wide periphery is freely rotatable adjacent to the delivery end of the load-supplying means and is turned by the weight of the load or batch of dough delivered thereto, this weight serving to overbalance and rotate the wheel and the wheel by its rotation operating to transfer the load or batch to a suitable discharging-point.

Another object of the invention is to provide means for opening a suitable cut-off device from a source of power independent of the movement of the scale-beam of the machine, the devices employed for this purpose being so organized as to enable the supply devices to feed material to the load-receiver without waiting for the scale-beam to return to its normal position.

All of these devices hereinbefore described may be assembled in an automatic weighing-machine especially adapted for weighing plastic substances, especially dough, and provided with means for applying to the receiving-surface of the load-receiver a layer of material, such as flour, for preventing adhesion of the plastic or dough to such surface, it being obvious that unless some means were employed for applying such a layer the plastic itself would adhere to the load-receiver and destroy the usefulness thereof as an automatic weighing-machine.

Figure 2:
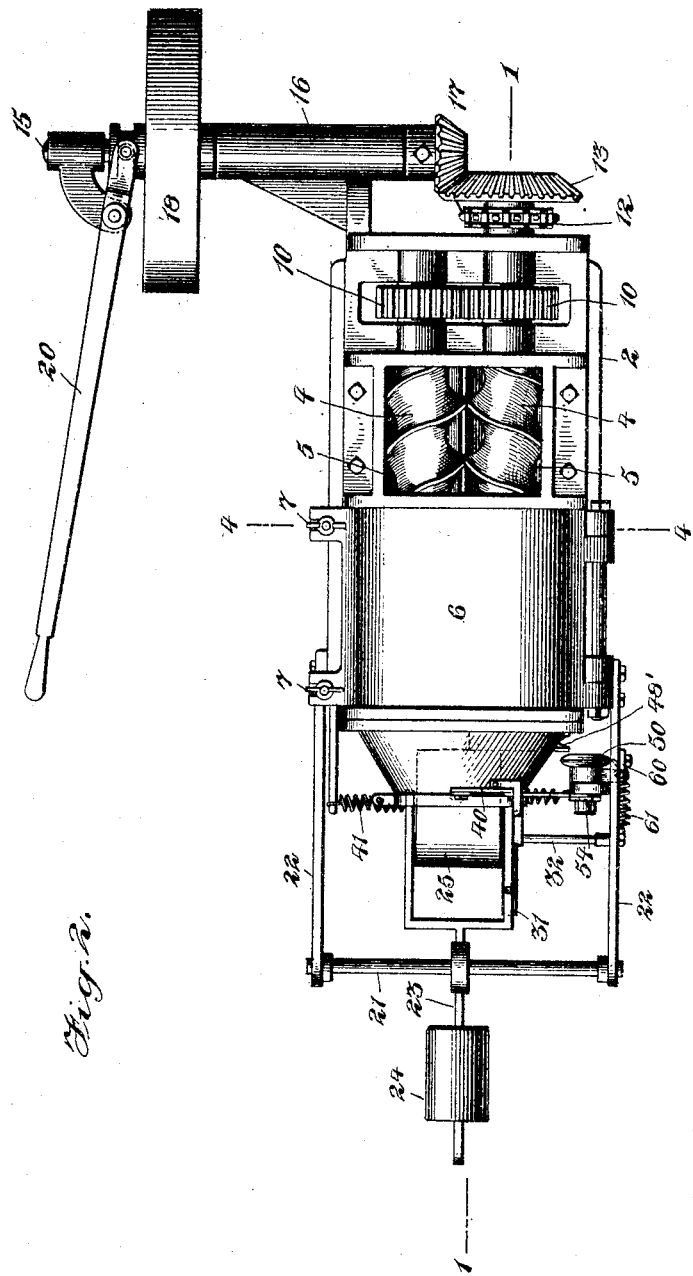

Figure 1 is a vertical section of an automatic weighing-machine embodying my invention, taken on line 1 1 of Fig. 2. Fig. 2 is a plan of the same. Fig. 3 is a front elevation of the same. Fig. 4 is an enlarged transverse section, taken in line 4 4, Fig. 2, illustrating in detail a pair of feed-screws and the feed-chamber in which they turn. Figs. 5 and 6 are enlarged details illustrating the open and closed positions of the cut-off device and its controlling parts. Figs 7 and 8 are enlarged sectional details illustrating the power devices for resetting the parts to open the cut-off device. Fig. 9 is a detail illustrating the pawl and ratchet-wheel for operating the flour-feeder.

Similar characters designate like parts in all the figures of the drawings.

The several operative parts of my improved weighing-machine may be mounted on a frame, such as 2, of any suitable construction. At its upper end this framework may support suitable load-supplying means, which in this case should embody not only a hopper, such as 3, having a suitable discharge-opening, but also force-feeding means for positively feeding the material to a load-receiver, such force-feeding means being necessary owing to the nature of the substance which my improved machine is especially designed to weigh. I prefer to employ a pair of force-feeders, which may be feed-screws, such as 4, disposed side by side parallel with each other in a pair of parallel openings 5 (see Figs. 1 and 4) in a feed-chamber immediately below and communicating with the supply-hopper 3, this feed-chamber being here shown as horizontal and consisting of a pair of members 6 and 6', forming a divided casing, the parts of which are clamped together by wing-nuts 7, carried by pivoted screws 7'. At the forward end thereof this feed-chamber communicates with a smaller tapered chamber 8, having a delivery-opening 8' therein common to and communicating with both feed-openings 5. At their rear ends the feed-screws 4 have shanks or shaft portions 4' mounted in suitable bearings at the rear end of the main feed-chamber, these shafts being operatively connected through the medium of a pair of gears 10, secured thereto, as shown. One of these shafts 4' is somewhat longer than the other and has at its rear end a sprocket-wheel 12 and a bevel-gear 13, the former of which is intended to operate the devices for imparting an opening movement to a cut-off device controlling the opening 8', while the latter is operated from a suitable source of power—such, for example, as a shaft 15, mounted in a long bearing 16, carried by a bracket projecting from the main frame 2, this shaft having at one end a beveled pinion 17, in mesh with the bevel-gear 13, and having at its other end a driving wheel or pulley 18, which may be rotatable continuously by a belt and is clutched to and unclutched from said shaft 15, substantially in the usual manner, by a shipping-lever 20.

A suitable scale-beam carrying a load-receiver will of course coöperate with the load-supplying means, and a cut-off device of proper construction should be employed to regulate the flow of material from such load-receiver. In the present construction the scale-beam is pivoted on a fixed rod 21, supported by brackets 22 at the forward side of the machine, and this scale-beam, which is designated by 23 and has an adjustable weight 24 at its forward end, is bifurcated at its rear end, in which is pivotally mounted a rotary load receiver or wheel, such as 25, the periphery of which is of sufficient width to receive plastic materials and permit the same to spread sidewise before cut-off takes place. It is important to mount this load-receiver in such a manner that when in its normal position (shown in Fig. 1) its peripheral load-receiving surface will be immediately adjacent to and preferably lie directly under and in advance of the delivery-opening 8' in order that the plastic substance as it is fed through such opening may be projected directly onto the surface of the load-receiver, by which it is immediately supported, and hence the factors of impact and momentum, which ordinarily vitiate the operation of an automatic weighing-machine, are reduced to a minimum and the weight 24 balanced wholly by the weight of the batch supported on the periphery of the wheel 25. As the material (indicated in dotted lines in Fig. 1) is forced onto the load-receiver 25 the latter is turned both by the pressure exerted thereon substantially tangentially by the travel of the mass and also by the mere weight of the mass located beyond the vertical diameter of the load-receiver, the result being that when the supply is cut off and the batch severed at the opening 8' the weight of the batch will rotate the receiver 25 quickly, and the mass will be as quickly discharged from the load-receiver onto a suitable surface below the same, (not shown,) it being understood that the portion of the periphery of the wheel 25 in contact with the mass should be covered with a layer of suitable material, such as flour, before the dough or other plastic comes in contact therewith.

When the proper weight has been made by the load-receiver, it will descend and should operate to cut off the supply at the opening 8'. In the construction shown the inner forked end of the scale-beam 23 serves to operate a lever which trips a holding device, such as a toggle, by means of which the cut-off device is held in its open position, and a spring normally held at tension may then quickly shift the cut-off device to its closed position and sever the plastic at the opening 8' with a knife-like action. Here the scale-beam carries an adjustable depending finger, such as 30, in the form of a bolt, the lower end of which engages the long arm of a lever 31, pivoted on a rod 32, carried by one of the bracket-arms 22, the short rear end of said lever being immediately under a releasing device or rod 33, mounted to slide in a vertical sleeve 34, fastened to a suitable support, such as the guide 35, on which the cut-off device or plate is intended to slide. This cut-off device is preferably a reciprocatory plate or knife 36, having a U-shaped opening the edges of which are beveled to form knife-edges, and at its outer side edges said plate is dovetailed into a corresponding slideway in the guide 35. This cut-off device 36 is pivoted in this case to the upper end of a long lever 37, pivoted on a stud 38 at the forward side of the main frame, and at its upper end said lever has a holding device in the form of a toggle 40, which when straightened, as shown in Fig. 5, holds the cut-off device in its open position, but which when struck permits the lever 37 to be operated to close the opening 8' by a quick knife-like cut-off movement of the plate 36, a strong spring, such as 41, being preferably employed to impart this closing movement to the cut-off device. In this construction the striking of the toggle is accomplished by forcing the upper end of the rod 33 against a suitable face of one of the toggle members, a separate rod or plate, such as 40', being secured to one of the toggle members for this purpose.

As soon as the lever 37 is drawn in by the spring 41 to the position shown by Fig. 6 the means for opening the cut-off device may be brought into action. These devices are preferably operated by power independent of that which results from the return of the scale-beam to its normal position, the power employed being preferably derived from the main source, before described, and transmitted by the sprocket-wheel 12 through a sprocketchain 45 to another sprocket-wheel 46, carried by a rotary actuator or shaft 47, extending from the rear to the front of the machine and journaled in suitable bearings therein, this shaft preferably having at its forward end a cam-wheel 48 with a series of cams 48' in the form of grooved tappets rising therefrom. Between this cam-wheel and the lever 37 is interposed an intermediate device adapted to be brought intermittently into the path of rotation of the wheel 48 to enable said cam to also reset the lever and its toggle in the position shown in Fig. 5 and of course simultaneously impart an opening movement to the cut-off device 36 to uncover the opening 8' again and permit the feeding of a new batch of the dough or other plastic to the load-receiver 35. Any suitable devices may be employed for the purpose of opening the cut-off device by power from a continuously-rotatable actuator instead of from the scale-beam; but in this construction the main elements of the device employed for this purpose are mounted directly on the lever 37. As shown in Figs. 1, 2, 3, 7, and 8, a bevel-edged roller 50 is carried on one end of a stud 51, mounted to reciprocate in a transverse bore in an enlarged portion 37' of said lever, said stud 51 having an arm 52, which serves the double function of supporting an antifriction-roller 53 and of preventing rotation of the stud itself, the enlargement 37' having a slot 37" cut therein, in which the arm or spline 52 works. A strong flat spring, such as 54, presses against the forward end of the stud 51, normally tending to force the beveled roller 50 into the path of rotation of the cam-wheel 48. A cam-face, such as 55, may be so located with respect to the antifriction-roller 53 as to deflect said roller, and with it the stud 51 and the beveled roller 50, out of the path of the cam-wheel and in opposition to the pressure exerted by the spring 54. When the roller 53 is at the bottom of this cam-face —that is, at the forward edge thereof, as seen at Figs. 1 and 8—the toggle 40 will be straight and will hold the roller 50 in the position shown in Fig. 8 regardless of the pressure of the spring 54. Immediately on the striking of said toggle, however, the lever 37 will be oscillated to the rear and the roller 50 will be shifted toward the axis of the shaft 47, (see Fig. 7,) and at the same time the spring 54 will force the spindle 51 and the roller 50 to the right, as seen in said figure. At the end of the movements of the lever 37 and the spindle 51 the roller 50 is in the path of the cams 48', and almost immediately one of said cams will strike the roller and force the same outward, and with it the lever 37, thus resetting the latter, straightening the toggle 40, and reopening the cut-off device. Owing to the fact that the cams 48' are grooved and each holds the roller against endwise movement during the resetting of the lever 37, the cam-face 55 is preferably yielding, it forming in this case part of a swinging arm 60, pivoted to one of the bracket-arms 22 and having a strong spring 61 for returning it and the roller 50 to the left, as seen in Figs. 1 and 8, when the roller 53 leaves the cam-groove.

It will be understood that the power mechanism is continuously operable, and hence when the machine is in action the feed-screws 4 and the cam-wheel 48 will rotate continuously, thus assuring a constant supply of plastic material to the delivery-opening 8' and also the prompt reopening of the cut-off device without the aid of the power exerted by the scale-beam.

Suitable means will of course coöperate with the devices hereinbefore described for the purpose of applying a layer of material to the load-receiving surface to prevent sticking of the plastic thereto, this material being flour when dough is the substance to be weighed by the machine. At the top of the feed-chamber and in front of the hopper I have therefore shown a flour receptacle or bin 65, suitably covered, as indicated at 66, this receptacle being supported in this case by bracket-arms 67 and 68. The bottom of said receptacle is perforated throughout its width, and immediately above the bottom thereof a rotary feeder or brush 70 is mounted within the bin, the shaft of this brush projecting beyond the walls of the bin and having a ratchet-wheel 71 secured thereto, while a pawl 72, engaging the teeth of said ratchet-wheel and carried at the upper end of an operating-rod 73, may be raised at each return of the scale-beam 23 to rotate said brush 70 and feed through the perforations in the bottom of the bin 65 a shower of flour to a new surface of the wheel 25 to prevent adhesion of the next batch of plastic thereto. The rod 73 passes through a suitable vertical guide 74 and has at its lower end a coiled spring 75 interposed between the lower end of said guide and a fixed stop 76 on the rod 73, this spring serving to impart the return or downward stroke to the pawl 72.

What I claim is—

1. In an automatic weighing-machine, the combination with a supply-hopper and with a feed-chamber below said hopper and having a pair of parallel feed-openings therein, of a pair of parallel feed-screws working in said openings, a delivery-spout common to said feed-openings and feed-screws, a scale-beam, a load-receiver carried by said scale-beam, and a cut-off device controlled by said scale-beam.

2. In an automatic weighing-machine, the combination with load-supplying means, of a scale-beam, a load-receiver carried by said scale-beam and having its load-receiving face adjacent to the delivery end of the load-supplying means, a cut-off device controlled by said scale-beam, and means for supplying a layer of material to said load-receiving face to prevent adhesion of the load thereto.

3. In an automatic weighing-machine, the combination with plastic-supplying means, of a scale-beam, a load-receiver carried by said scale-beam and having its load-receiving face adjacent to the delivery end of the supplying means, a cut-off device controlled by said scale-beam, and means for applying a layer of material to said load-receiving face to prevent adhesion of the load thereto.

4. In an automatic weighing-machine, the combination with dough-feeding means, of a scale-beam, a dough-receiver carried by said scale-beam and having its dough-receiving face adjacent to the delivery end of the dough-feeding means, a cut-off device controlled by said scale-beam, and means for applying a layer of flour to said dough-receiving face to prevent adhesion of dough thereto.

5. In an automatic weighing-machine, the combination with dough-feeding means, of a scale-beam, a dough-receiver carried by said scale-beam and having its dough-receiving face adjacent to the delivery end of the dough-feeding means, a cut-off device controlled by said scale-beam, a flour-receptacle, and an intermittently-rotatable flour-feeder for applying a layer of flour to said dough-receiving face to prevent adhesion of dough thereto.

6. In an automatic weighing-machine, the combination with dough-feeding means, of a scale-beam, a dough-receiver carried by said scale-beam and having its dough-receiving face adjacent to the delivery end of the dough-feeding means, a cut-off device controlled by said scale-beam, a flour-receptacle, and a flour-feeder operated by said scale-beam for feeding a layer of flour to said dough-receiving face to prevent adhesion of dough thereto.

7. In an automatic weighing-machine, the combination with load-supplying means, of a scale-beam, a load-receiver carried by said scale-beam, a cut-off device, a toggle for holding said cut-off device in its open position, means for closing said cut-off device, and a sliding rod controlled by the descent of the scale-beam for striking said toggle.

8. In an automatic weighing-machine, the combination with load-supplying means, of a scale-beam, a load-receiver carried by said scale-beam, a cut-off device controlled by said scale-beam, and means for supplying a layer of material to the load-receiving face of said receiver to prevent adhesion of the load thereto.

9. In an automatic weighing-machine, the combination with load-supplying means, of a cut-off device, a scale-beam, an actuator for controlling the opening and closing movements of said cut-off device, an intermediate device for effecting the opening movement of said actuator, means controlled by said scale-beam for effecting said closing movement, means independent of the scale-beam for actuating said intermediate device, and means for causing the latter and its said actuating means to be intermittently brought into and out of operative relation relatively to each other, for the purpose set forth.

10. In an automatic weighing-machine, the combination with load-supplying means, of a cut-off device, a scale-beam, an actuator for controlling the opening and closing movements of said cut-off device, an intermediate device for effecting the opening movement of said actuator, means controlled by said scale-beam for effecting said closing movement, and a continuously-rotatable cam-wheel for actuating said intermediate device.

11. In an automatic weighing-machine, the combination with load-supplying means, of a cut-off device, a scale-beam, an actuator for controlling the opening and closing movements of said cut-off device, an intermediate device for effecting the opening movement of said actuator, means controlled by said scale-beam for effecting said closing movement, a continuously-rotatable cam-wheel for actuating said intermediate device, and a spring normally tending to force said intermediate device into the path of said cam-wheel.

12. In an automatic weighing-machine, the combination with load-supplying means, of a cut-off device, a scale-beam, an actuator for controlling the opening and closing movements of the said cut-off device, an intermediate device for effecting the opening movement of said device, means controlled by said scale-beam for effecting said closing movement, a continuously-operable actuator for said intermediate device, and means for intermittently moving the latter to and from a position to be acted upon by said actuator.

In testimony whereof I have signed my name to this specification, in the presence of two subscribing witnesses, this 7th day of April, 1902.

GEORGE J. HICKS.

Witnesses:
 CHAS. F. DANE,
 M. L. FORREST.